US007292410B2

(12) United States Patent
Nayak et al.

(10) Patent No.: US 7,292,410 B2
(45) Date of Patent: Nov. 6, 2007

(54) TAPE DRIVE HEAD CLEANER

(75) Inventors: Ashok B. Nayak, Glendora, CA (US); Somsack Vilaysack, Bellflower, CA (US)

(73) Assignee: Certance, LLC, Scotts Valley, CA (US)

( * ) Notice: Subject to any disclaimer, the term of this patent is extended or adjusted under 35 U.S.C. 154(b) by 187 days.

(21) Appl. No.: 10/697,101

(22) Filed: Oct. 31, 2003

(65) Prior Publication Data
US 2004/0136115 A1 Jul. 15, 2004

Related U.S. Application Data

(60) Provisional application No. 60/435,252, filed on Dec. 19, 2002.

(51) Int. Cl.
*G11B 5/41* (2006.01)
(52) U.S. Cl. ..................................... 360/128
(58) Field of Classification Search ............... 360/128, 360/96.5, 130.21, 92, 267.4, 267.8, 46
See application file for complete search history.

(56) References Cited

U.S. PATENT DOCUMENTS

| | | | |
|---|---|---|---|
| 3,774,916 A * | 11/1973 | Nanba ...................... 360/92 |
| 4,139,877 A * | 2/1979 | Townsend ................ 360/267.8 |
| 5,182,691 A * | 1/1993 | Mimasu et al. ............. 360/128 |
| 5,589,755 A | 12/1996 | Kaite et al. |
| 5,867,352 A * | 2/1999 | Dohmen ................. 360/130.21 |
| 5,930,089 A * | 7/1999 | Anderson ................... 360/128 |
| 6,057,980 A * | 5/2000 | Todd et al. ................ 360/96.5 |
| 6,069,776 A * | 5/2000 | Hasegawa et al. .......... 360/128 |
| 6,154,341 A * | 11/2000 | Dallago ..................... 360/128 |
| 6,166,881 A | 12/2000 | Anderson et al. |
| 6,215,618 B1 | 4/2001 | Anderson et al. |
| 6,252,739 B1 * | 6/2001 | Todd et al. ................. 360/128 |
| 6,333,831 B1 * | 12/2001 | Todd ......................... 360/128 |
| 6,359,751 B1 * | 3/2002 | Groel et al. ................ 360/128 |
| 6,433,961 B1 * | 8/2002 | Tsuchiya et al. ........... 360/128 |
| 6,697,230 B1 * | 2/2004 | Nayak ..................... 360/267.4 |
| 6,867,947 B2 * | 3/2005 | Davis ........................ 360/128 |
| 2003/0128966 A1 * | 7/2003 | Fritsch et al. ................ 386/46 |
| 2004/0042121 A1 * | 3/2004 | Davis ......................... 360/128 |

* cited by examiner

*Primary Examiner*—Tianjie Chen
(74) *Attorney, Agent, or Firm*—Mark J. Spolyar

(57) ABSTRACT

A tape drive head cleaner has a brush that is driven to sweep over a write/read head in the direction of longitudinal grooves on the write/read head. Debris that are within the grooves are swept out of the grooves by the movement of the brush in the direction of the grooves. The brush is carried by a tape drive head cleaner mechanism that includes a lead screw driven by a stepper motor that engages the half nut attached to a brush carriage that carries the brush. The brush carriage is guided by fixed guide shafts so that the brush is precisely swept over the write/read head.

26 Claims, 4 Drawing Sheets

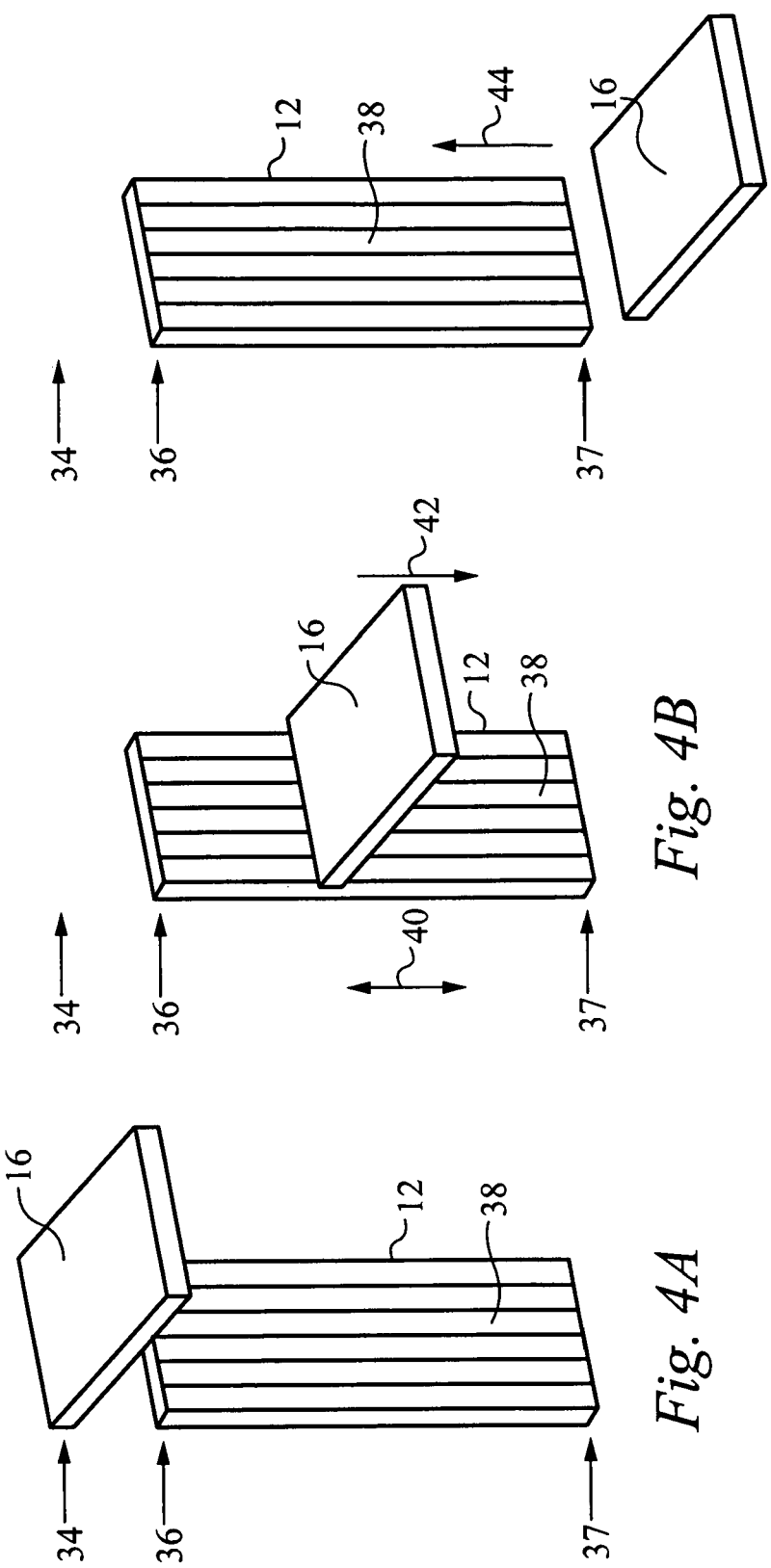

TAPE DRIVE HEAD CLEANER

RELATED APPLICATIONS

This application claims priority to provisional application 60/435,252, filed on Dec. 19, 2002, the entire contents of which are incorporated herein.

FIELD OF THE INVENTION

The present invention relates to the field of tape drives, such as linear tape drives, and more particularly, to apparatus and arrangements for cleaning a tape drive head.

BACKGROUND OF THE INVENTION

Tape drive devices for storing magnetic data are well known in the art. In the forward mode, tape is moved from a supply reel, which supplies the tape, to a take-up reel, which draws tape from the supply reel along the tape path and over the magnetic write/read head. In the reverse mode, tape is moved from the take-up reel to the supply reel.

In certain tape cartridge configurations, only a single reel, generally the supply reel, is provided in the tape cartridge or magazine. This type of cartridge is used with a tape drive having a take-up reel permanently housed in the tape drive unit. In such tape drives, a tape cartridge is inserted into the tape drive unit. The cartridge is then registered and the front end, or leader end, of the tape is transferred from the supply reel along the tape path of the tape drive to the take-up reel. The magnetic write/read head, which reads or writes to the tape, is located along the tape path and the take-up reel serves to draw the tape across the magnetic write/read head. Examples of such cartridges include DLT (Digital Linear Tape) cartridges made by Quantum, 3480/3490 cartridges made by IBM, and LTO (Linear Tape Open) cartridges made by Hewlett-Packard and IBM.

As the tape is being written or read, the tape traverses the surface of the write/read head. In conventional write/read heads, grooves are provided on the surface to improve the tape-to-head contact while the tape is traversing over the write/read head. Unfortunately, the motion of the tape against the write/read head generates debris which settle into the grooves of the write/read head. This causes abnormal contact between the tape and write/read head. Accumulation of the debris left on the write/read head raise concerns regarding proper tape-to-head contact on the write/read head, as well as inaccurate write and read functionality.

Cleaning devices for the heads of tape drives are known and described, for example, in U.S. Pat. Nos. 5,930,089; 6,166,881; 6,215,618; and 6,359,751. However, such mechanisms generally provide for a movement of a cleaning brush across the magnetic write/read head in a direction perpendicular to the longitudinal access of the write/read head. Debris that settle in the grooves may not be adequately dislodged from these grooves by such apparatus. Failure to dislodge these debris from the grooves allows an accumulation of debris that deteriorate the performance of the tape drive over time and increased use.

SUMMARY OF THE INVENTION

There is a need for a tape drive head cleaner that provides an improved cleaning of the write/read head, and particularly, removing accumulated debris in the grooves of the write/read head.

This and other needs are met by embodiments of the present invention which provide a cleaning apparatus for a magnetic write/read head of a tape drive comprising a cleaning brush and means for guiding the cleaning brush in a same direction as grooves in the write/read head.

In other aspects of the invention, the needs are also met by a tape drive head cleaner for a tape drive having a magnetic write/read head. A head cleaner comprises a brush carriage and a brush mounted on a brush carriage. A brush carriage movement mechanism is coupled to the brush carriage for moving the brush carriage to cause the brush to sweep along the length of the read/write head.

In still other aspects of the invention, the earlier stated needs are met by a tape drive comprising a write/read head having grooves extending along a first axis, a brush, and a brush carriage on which the brush is mounted. The brush carriage is controllably moveable to sweep the brush on a write/read head along the first axis.

Some of the advantages of the invention include the sweeping of the brush along the same direction as the grooves of the write/read head, which allows the bristles of the brush to enter the grooves and provide a deeper, fuller cleaning of the write/read head. The improved removal of debris prevents an accumulation that causes deterioration of performance over time of the tape drive.

The foregoing and other features, aspects and advantages of the present invention will become more apparent from the following detailed description of the present invention when taken in conjunction with the accompanying drawings.

BRIEF DESCRIPTION OF THE DRAWINGS

FIGS. 4A-4C schematically depict the brushing operation during various phases of the operation, in accordance with embodiments of the present invention.

DETAILED DESCRIPTION OF THE INVENTION

The present invention addresses and solves problems related to the cleaning of a magnetic write/read head in a tape drive. In particular, the invention improves upon previous arrangements by providing a tape drive head cleaner that sweeps a brush in the direction of the grooves in a magnetic write/read head. Sweeping of the brush along the grooves removes accumulated debris from the grooves and provides a thorough and deep cleaning of the write/read head in an efficient manner. The improved cleaning of the write/read head increases the accuracy of the write and read operations as well as the life span of the tape drive.

Figure 1:
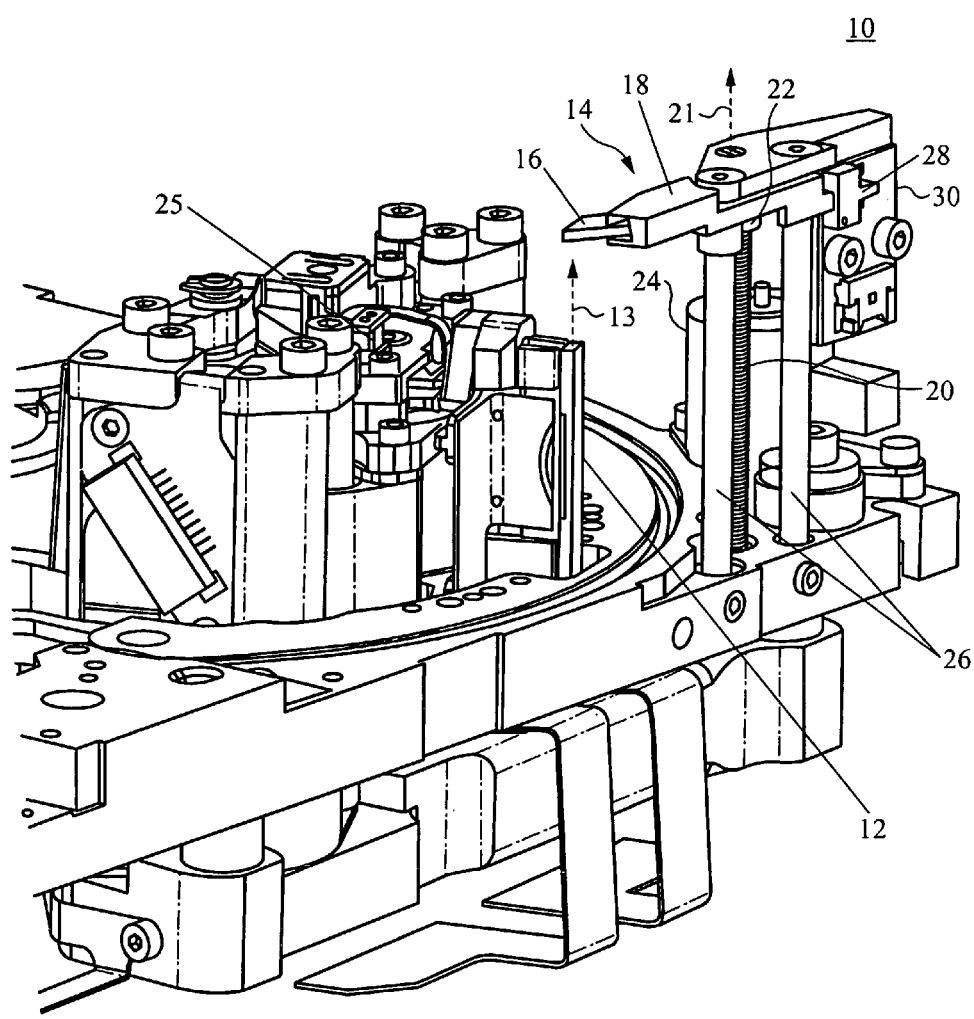
FIG. 1 is a perspective view of a portion of a tape drive constructed in accordance with embodiments of the present invention.
Figure 2:
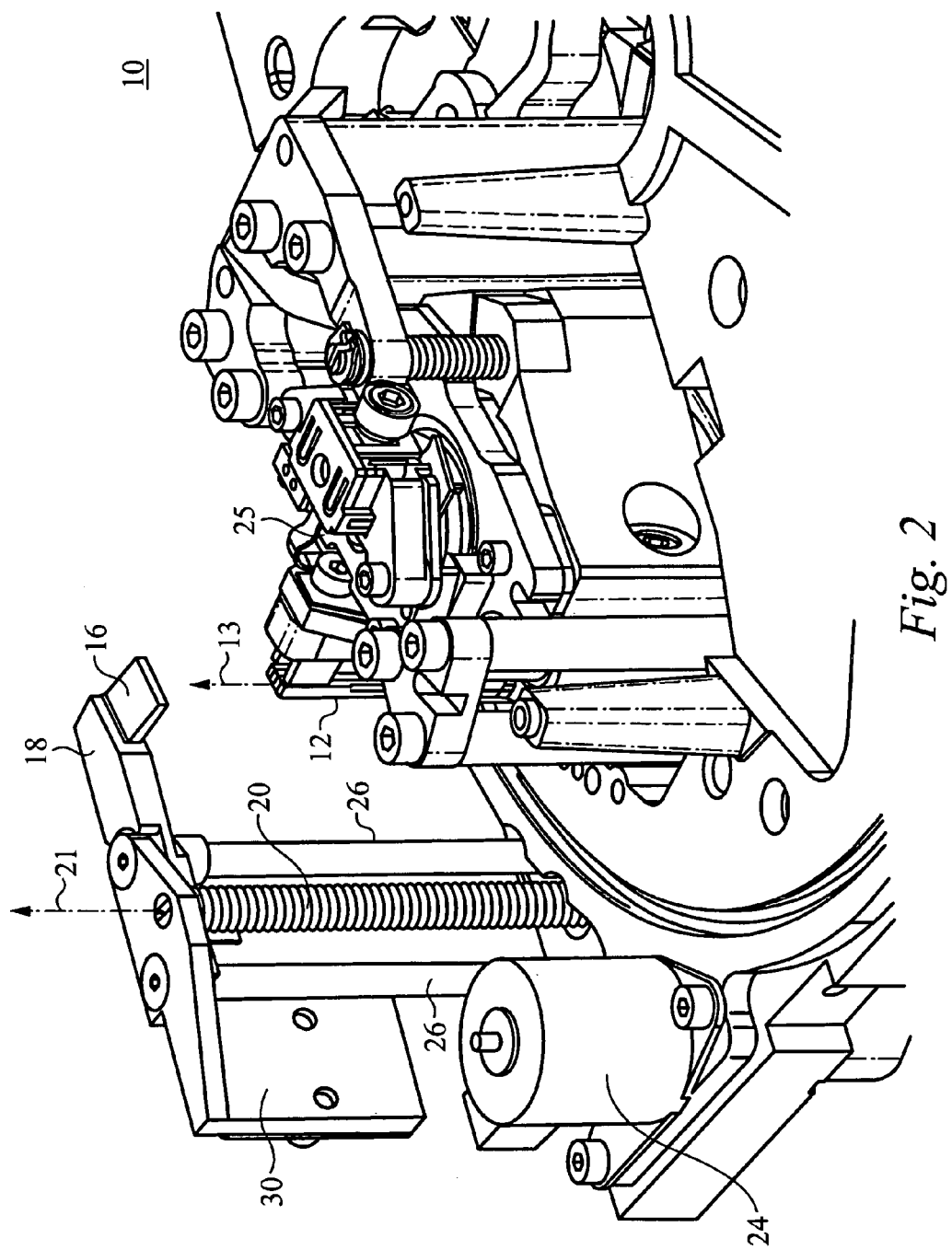
FIG. 2 is another perspective view of the tape drive of FIG. 1, viewed at a different angle.
Figure 3:
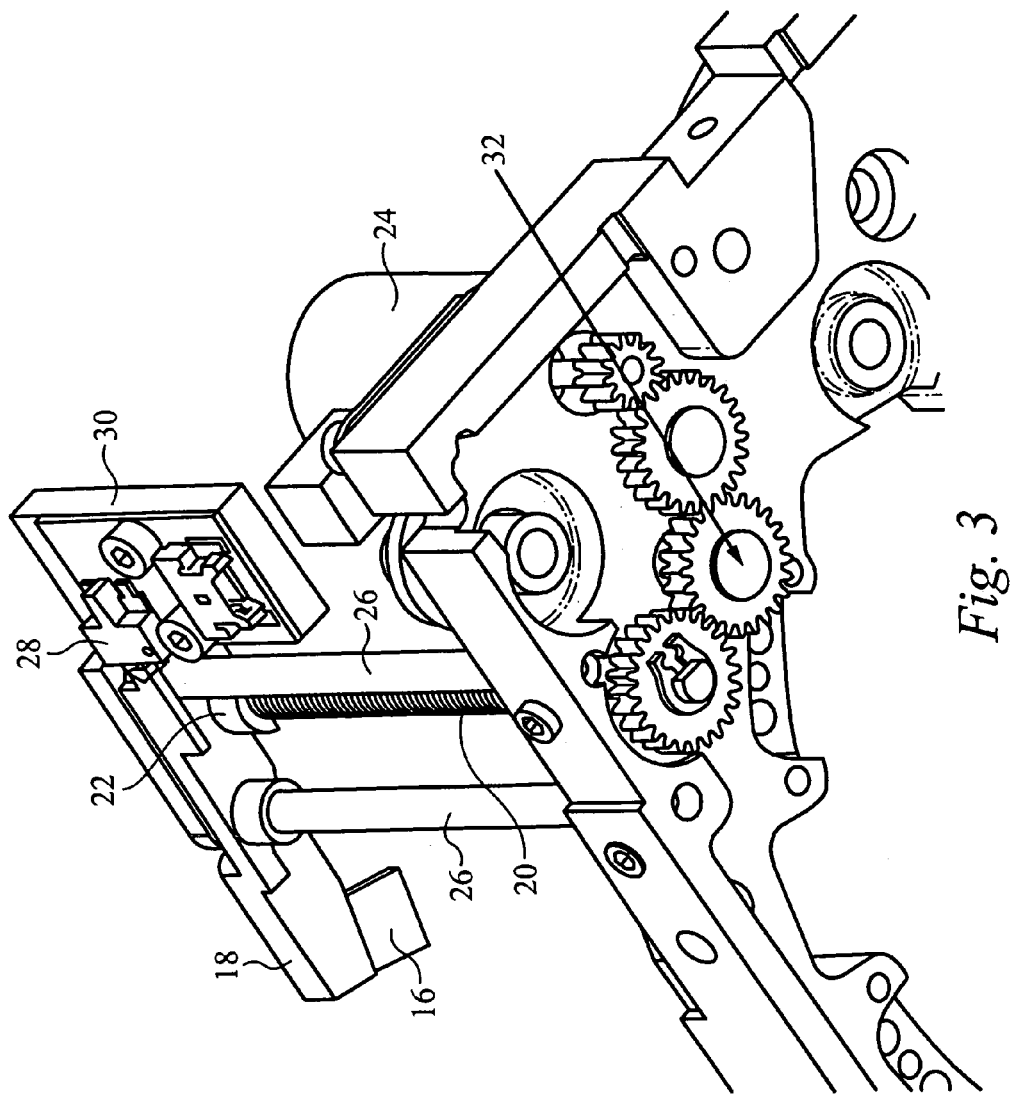
FIG. 3 is a perspective view of the tape drive of FIGS. 1 and 2, taken from underneath the tape drive.

FIGS. 1-3 show various perspective views of a tape drive 10 constructed in accordance with embodiments of the present invention. Certain elements, such as the housing, guide rollers, etc. have been removed for illustration purposes. Further, although certain details of an exemplary tape drive are depicted, only those elements that are relevant to explaining the present invention have been provided with reference numerals and will be described.

The tape drive 10 has a magnetic write/read head 12 over which tape is guided. The write/read head 12 has a number of grooves (not seen in FIGS. 1-3) to improve tape-to-head contact when the tape is traversing over the write/read head 12. Unfortunately, motion of the tape against the write/read head 12 generates debris which settle into the grooves of the write/read head 12. The debris can cause abnormal contact between the tape and the write/read head 12.

During normal write/read operation, the write/read head 12 is positioned by a write/read head actuator 25. Course and fine positioning is achieved by this actuator 25. As will be described in more detail later, the write/read head actuator 25 also plays a role in the cleaning of the write/read head 12 in certain embodiments of the present invention.

Following winding of the tape into the tape cartridge, so that the tape no longer contacts the write/read head 12, a tape drive head cleaner 14 may be employed to clean the write/read head 12. A brush 16, made of an appropriate cleaning material, such as nylon bristles or other suitable material, is caused to contact and clean the write/read head 12 in the manner described below. Tape drive head cleaner 14 includes a brush carriage 18 that carries the brush 16.

In the embodiment of FIGS. 1-3, the brush carriage 18 is slidably mounted on a pair of guide shafts 26 vertically extending on the tape drive. Guide shafts 26 constrain movement of the brush carriage 18 along a vertical axis. This axis is parallel to the longitudinal axis of the write/read head 12. The constraining ensures an accurate placement of the brush 16 against the surface of the write/read head 12. The longitudinal axis of the write/read head 12 is provided with reference numeral 13 in the figures, and referred to as the first axis 13. The axis of the brush carriage movement is referred to as the second axis 21 in the figures.

A rotatable lead screw 20 interacts with a half nut 22 mounted on the brush carriage 18 to raise and lower the brush carriage 18 on the guide shafts 26. The precise controlling of the vertical movement of the brush carriage 18 is achieved by use of the lead screw 20 and half nut 22. A stepper motor 24 is coupled by a gear train 32 to provide the driving force of the lead screw 20. Under the control of a controller (not depicted), the stepper motor 24 is able to cause the gear train 32 to rotate the lead screw 20 by a precise number of steps to move the brush 16 in a desired manner.

A limit switch 28 is provided to detect a reference position of the brush carriage 18. The limit switch 28 is held in place by a limit switch holder 30 that is fixed to the housing (not shown) or other stationary element of the tape drive 10. Hence, the limit switch 28 informs the controller as to when the brush carriage 18 reaches the reference position. During movement of the brush carriage 18, the controller causes the step motor 24 to move the brush carriage 18 by a desired number of steps with relation to the reference position defined by the limit switch 28. This provides for a precise control of the position of the brush carriage 18. After a cleaning of the write/read head 12, the brush carriage 18 is returned to the reference position defined by the limit switch 28 and parked in this position.

In certain embodiments of the invention, the write/read head actuator 25 is activated to move the write/read head 12 up and down along the first axis 13 at the same time the brush 16 is moved up and down to sweep the length of the grooves in the write/read head 12. The movement of the write/read head 12 created by the write/read head actuator 25 serves to agitate and loosen the debris, which the brush 16 sweeps out of the grooves in the write/read head 12. In certain other embodiments of the invention, the write/read head actuator 25 is not activated so that the cleaning is performed entirely by the brush 16.

FIGS. 4A-4C show different phases of the cleaning cycle. In FIG. 4A, the brush 16 is in the reference position 34 (as determined by the limit switch 28). This reference position 34 is above a first axial end 36 of the write/read head 12. The grooves 38 of the write/read head are depicted in FIGS. 4A-4C. At this time, the bristles of the brush 16 have not entered the grooves 38.

Agitation and loosening of the debris is provided for by the movement created by the write/read head actuator 25 in an up and down motion along the first axis 13 the write/read head 12. This up and down movement direction is indicated by arrow 40 in FIG. 4B. At the same time, brush 16 is caused to sweep the write/read head 12 and enter the grooves 38 by control of the stepper motor 24. The lead screw 20 is rotated through the gear train 32 by the stepper motor 24. Precise rotation of the lead screw 20, which interacts with the half nut 22, causes the brush carriage 18 carrying the brush 16 to move vertically downward in the direction of arrow 42 in FIG. 4B. The brush 16, having entered the grooves 38, sweeps the debris agitated by the actuator movement of the write/read head 12 downwardly.

The debris are swept completely out of the grooves 38 of the write/read head 12 when the brush 16 has swept past the second axial end 37 of the write/read head 12, as depicted in FIG. 4G. Once it has reached the bottom extent of its travels, as determined by the number of steps that the stepper motor 24 has rotated the lead screw 20, the brush 16 is moved in an upward direction 44 to again sweep the grooves 38 of the write/read head 12. While the term "completely" is used to characterize a level of debris removal from the write/read head 12, the skilled artisan will readily recognize that "completely" is a relative term. As such there can perhaps still be some level of contamination remaining on the write/read head 12 once the cleaning cycle has completed. Any remaining contaminants will typically not interfere with write/read head 12 performance.

The brush carriage 18 is driven up and down in the direction of arrows 42 and 44 several times, in certain embodiments of the invention, to perform the cleaning action of a cleaning cycle. At the end of the cleaning cycle, the brush carriage 18 is again driven upwardly until it triggers the limit switch 28 and is parked in this position. The cleaning cycle is now complete and the tape drive 10 is ready for use with a cleaned write/read head 12.

The present invention thus provides a thorough and improved cleaning of debris from grooves of a write/read head of a tape drive in a compact arrangement that may be precisely controlled. The thorough removal of debris from a write/read head improves the performance of the tape drive as well as increases the useful life of the tape drive.

Although the present invention has been described and illustrated in detail, it is to be clearly understood that the same is by the way of illustration and example only, and is not to be taken by way of limitation, the scope of the present invention being limited only by the terms of the appended claims.

What is claimed is:

1. A tape drive head cleaner for a tape drive having a magnetic read/write head, the head cleaner comprising:
   a brush carriage;
   a brush mounted on the brush carriage; and
   a brush carriage movement mechanism coupled to the brush carriage for moving the brush carriage to cause the brush to sweep along the length of the read/write head along a first direction and a second opposite direction following winding of a tape into a tape cartridge wherein the brush moving in the second direction occurs once movement in the first direction has completed.

2. The head cleaner of claim 1, wherein the read/write head has longitudinal grooves, and the brush has bristles, and wherein the brush carriage movement mechanism is configured to move the brush carriage so as to cause the brush bristles to enter the grooves and move the brush in the direction of the grooves.

3. The head cleaner of claim 1 further comprising an actuator coupled to the read/write head, the actuator controllable to move the read/write head during movement of the brush carriage.

4. The head cleaner of claim 1 wherein the brush carriage movement mechanism comprises a lead screw and a half nut on the brush carriage, the half nut engaging the lead screw such that rotation of the lead screw drives the brush carriage vertically along the lead screw.

5. The head cleaner of claim 4, wherein the brush carriage movement mechanism further comprises a stepper motor coupled to the lead screw to control the rotation of the lead screw.

6. The head cleaner of claim 1 further comprising a limit switch fixed in a position to detect the reference position of the brush carriage.

7. The head cleaner of claim 1 further comprising a controller to control the stepper motor to control movement of the brush carriage in relation to the reference position and cause the brush to sweep the entire length of the read/write head.

8. The head cleaner of claim 7, wherein the controller further controls the stepper motor to control movement of the brush carriage to cause the brush to sweep past a bottom edge of the read/write head.

9. The head cleaner of claim 1 wherein the brush carriage movement mechanism further comprises guide shafts on which the brush carriage is mounted so as to be guided during movement of the brush carriage in response to the rotation of the lead screw.

10. The tape drive of claim 1 wherein the single event comprises completion of winding of a tape onto a tape cartridge.

11. The tape drive of claim 1 wherein the brush is at a reference position above a first axial end of the read/write head when a tape is in contact with the read/write head, and wherein a first distance from the reference position to a closest exterior portion of the tape drive is less than a second distance front a position below a second axial end of the read/write head to the closest exterior position, and wherein the closest exterior portion is orthogonal to the first direction and the second opposite direction.

12. A tape drive comprising:
a write/read head having grooves extending along a first axis;
a brush; and
a brush carriage on which the brush is mounted, the brush carriage controllably movable to sweep the brush on the write/read head along the first axis along a first direction and a second opposite direction following winding of a tape into a tape cartridge wherein the brush moving in the second direction occurs once movement in the first direction has completed.

13. The tape drive of claim 12, further comprising a write/read head actuator configured to move the write/read head on the first axis.

14. The tape drive of claim 13, wherein the write/read head actuator is further configured to move the write/read head along the first axis simultaneously with the sweep of the brush on the write/read head.

15. The tape drive of claim 13, further comprising a lead screw and a half nut on the brush carriage and carried by the lead screw rotation of the lead screw during the brush carriage along the lead screw.

16. The tape drive of claim 15, wherein a longitudinal axis of the lead screw is parallel to the first axis such that the brush carriage is moved along a second axis parallel to the first axis and the brush is moved along the first axis.

17. The tape drive of claim 12, further comprising a stepper motor and a gear train operatively coupled between the stepper motor and the lead screw, with the stepper motor operable to rotate the lead screw to move the brush up and down in steps along the first axis.

18. The tape drive of claim 12, further comprising a limit switch operable to sense movement of the brush to the reference position.

19. The tape drive of claim 12, wherein the stepper motor is controllable to move the brush from a reference position above a first axial end of the write/read head to a position below a second axial end of the write/read head.

20. The tape drive of claim 12, wherein the brush is arranged on the brush carriage such that bristles of the brush enter the grooves of the write/read head when the brush sweeps on the write/read head and exit the grooves when the brush is moved to the reference position and to the position below the second axial end of the write/read head.

21. The tape drive of claim 12, further comprising guide shafts extending parallel to the first axis, the brush carriage slidably mounted on the guide shafts to constrain movement of the brush carriage along the second axis.

22. The tape drive of claim 12 wherein the single event comprises completion of winding of a tape onto a tape cartridge.

23. The tape drive of claim 12, wherein the brush is at a reference position above a first axial end of the write/read head when a tape is in contact with the write/read head, and wherein a first distance from the reference position to a closest exterior portion of the tape drive is less than a second distance from a position below a second axial end of the read/write head to the closest exterior position, and wherein the closest exterior portion is orthogonal to the first direction and the second opposite direction.

24. A tape drive head cleaner for use with a magnetic read/write head, the read/write head oriented along a first axis, the tape drive head cleaner comprising:
a cleaning element adapted to come into contact with and clean the magnetic read/write head in a first direction and a second opposite direction following winding of a tape into a tape cartridge wherein the brush moving in the second direction occurs once movement in the first direction has completed; and
a movement mechanism coupled to the cleaning element and configured to move the cleaning element, wherein the movement mechanism moves the cleaning element along the first axis when moving the cleaning element in the first and second directions.

25. The tape drive head cleaner of claim 24 wherein the single event comprises completion of winding of a tape onto a tape cartridge.

26. The tape drive head cleaner of claim 24 wherein the cleaning element is at a reference position above a first axial end of the read/write head when a tape is in contact with the read/write head, and wherein a first distance from the reference position to a closest exterior portion of a tape drive is less than a second distance from a position below a second axial end of the read/write head to the closest exterior position and wherein the closest exterior portion is orthogonal to the first and second directions.

* * * * *